(12) United States Patent
Boyle et al.

(10) Patent No.: US 8,996,839 B1
(45) Date of Patent: Mar. 31, 2015

(54) DATA STORAGE DEVICE ALIGNING PARTITION TO BOUNDARY OF SECTOR WHEN PARTITION OFFSET CORRELATES WITH OFFSET OF WRITE COMMANDS

(75) Inventors: William B. Boyle, Lake Forest, CA (US); Kai Ling Lee, Shah Alam (MY); Sang Huynh, Yorba Linda, CA (US); Ayberk Ozturk, Irvine, CA (US); Billy Rickey, Newport Beach, CA (US); Aznizam Abdullah Salehudin, Bandar Baru Bangi (MY); Robert M. Fallone, Newport Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 251 days.

(21) Appl. No.: 13/356,453

(22) Filed: Jan. 23, 2012

(51) Int. Cl.
*G06F 12/02* (2006.01)
*G06F 12/06* (2006.01)

(52) U.S. Cl.
USPC .......................................... 711/201; 711/120

(58) Field of Classification Search
USPC ....................................................... 711/201
See application file for complete search history.

(56) References Cited

U.S. PATENT DOCUMENTS

| | | | |
|---|---|---|---|
| 5,325,526 A | 6/1994 | Cameron et al. |
| 5,613,066 A | 3/1997 | Matsushima et al. |
| 5,675,769 A | 10/1997 | Ruff et al. |
| 5,813,025 A | 9/1998 | Murphy et al. |
| 5,822,142 A | 10/1998 | Hicken |
| 6,018,789 A | 1/2000 | Sokolov et al. |
| 6,035,351 A | 3/2000 | Billings et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,092,231 A | 7/2000 | Sze |
| 6,094,707 A | 7/2000 | Sokolov et al. |
| 6,105,104 A | 8/2000 | Guttmann et al. |
| 6,111,717 A | 8/2000 | Cloke et al. |
| 6,112,277 A | 8/2000 | Bui et al. |
| 6,125,435 A | 9/2000 | Estakhri et al. |
| 6,145,052 A | 11/2000 | Howe et al. |
| 6,175,686 B1 | 1/2001 | Noda |
| 6,175,893 B1 | 1/2001 | D'Souza et al. |

(Continued)

FOREIGN PATENT DOCUMENTS

| | | |
|---|---|---|
| CN | 1258913 A | 7/2000 |
| WO | 2011062861 | 5/2011 |

OTHER PUBLICATIONS

Office Action dated Sep. 5, 2013 from U.S. Appl. No. 13/356,542, 32 pages.

(Continued)

*Primary Examiner* — Mardochee Chery
*Assistant Examiner* — Zubair Ahmed (57) ABSTRACT

A data storage device is disclosed comprising a non-volatile memory comprising a plurality of sectors. A partition map is evaluated that identifies a partition accessed through a plurality of logical block addresses (LBAs), where each LBA maps to a fraction of a sector. A partition offset is determined for the partition relative to a boundary of one of the sectors. N write commands are received each having a write offset relative to a corresponding sector. When the write offset for X of the N write commands matches the partition offset, at least part of the partition is moved to align at least part of the partition to a boundary of one of the sectors.

20 Claims, 5 Drawing Sheets

(56) References Cited

U.S. PATENT DOCUMENTS

| | | |
|---|---|---|
| 6,178,056 B1 | 1/2001 | Cloke et al. |
| 6,178,487 B1 | 1/2001 | Ruff et al. |
| 6,185,666 B1 * | 2/2001 | Murray et al. ............... 711/173 |
| 6,191,712 B1 | 2/2001 | Still |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,324,604 B1 | 11/2001 | Don et al. |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,385,711 B1 | 5/2002 | Colligan |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,453,383 B1 | 9/2002 | Stoddard et al. |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,532,517 B1 | 3/2003 | Wagner et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| RE38,502 E | 4/2004 | Yonemitsu |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,751,686 B2 | 6/2004 | Takasugi et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |

(56) References Cited

U.S. PATENT DOCUMENTS

| | | |
|---|---|---|
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,988,178 B1 | 1/2006 | Shirai et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,603 B1 | 7/2006 | Chheda |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,099,993 B2 | 8/2006 | Keeler |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,117 B2 | 2/2008 | Ferguson et al. |
| 7,330,323 B1 | 2/2008 | Singh et al. |
| 7,330,417 B2 | 2/2008 | Billau et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,395,404 B2 | 7/2008 | Gorobets et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,461,202 B2 | 12/2008 | Forrer, Jr. et al. |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,574,558 B2 | 8/2009 | Morley et al. |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |

(56) References Cited

U.S. PATENT DOCUMENTS

| | | |
|---|---|---|
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,046,533 B2 | 10/2011 | Kompella et al. |
| 8,051,044 B1 | 11/2011 | Dyatlov et al. |
| 8,055,842 B1 | 11/2011 | Iyer |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,285,965 B2 | 10/2012 | Karr et al. |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,495,289 B2 | 7/2013 | Moyer |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,126 B1 | 11/2013 | Gaonkar et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2004/0019718 A1 | 1/2004 | Schauer et al. |
| 2004/0255093 A1 | 12/2004 | Forrer, Jr. et al. |
| 2005/0036381 A1 | 2/2005 | Hassner et al. |
| 2005/0071583 A1 | 3/2005 | Shepherd |
| 2005/0125614 A1 | 6/2005 | Royer, Jr. |
| 2005/0210214 A1 | 9/2005 | Takase et al. |
| 2006/0136655 A1 | 6/2006 | Gorobets et al. |
| 2007/0076936 A1 | 4/2007 | Li et al. |
| 2007/0079305 A1 | 4/2007 | Duerinckx |
| 2007/0143561 A1 | 6/2007 | Gorobets |
| 2007/0192533 A1 | 8/2007 | Kim et al. |
| 2008/0016275 A1 | 1/2008 | Sebastian et al. |
| 2008/0028162 A1 | 1/2008 | Thompson |
| 2008/0162811 A1 | 7/2008 | Steinmetz et al. |
| 2009/0031089 A1 | 1/2009 | Tuominen |
| 2009/0070518 A1 | 3/2009 | Traister et al. |
| 2009/0113702 A1 | 5/2009 | Hogg |

(56) References Cited

U.S. PATENT DOCUMENTS

| | | | |
|---|---|---|---|
| 2009/0228744 | A1 | 9/2009 | Deenadhayalan et al. |
| 2009/0271562 | A1 | 10/2009 | Sinclair |
| 2009/0276662 | A1 | 11/2009 | Shen et al. |
| 2009/0313426 | A1 | 12/2009 | See et al. |
| 2010/0232049 | A1 | 9/2010 | Kompella et al. |
| 2010/0306551 | A1 | 12/2010 | Meyer et al. |
| 2011/0047347 | A1 | 2/2011 | Li et al. |
| 2011/0125977 | A1* | 5/2011 | Karr et al. ............. 711/162 |
| 2011/0226729 | A1 | 9/2011 | Hogg |
| 2012/0159042 | A1 | 6/2012 | Lott et al. |
| 2012/0272038 | A1 | 10/2012 | Wei et al. |
| 2012/0275050 | A1 | 11/2012 | Wilson et al. |
| 2012/0281963 | A1 | 11/2012 | Krapf et al. |
| 2012/0324980 | A1 | 12/2012 | Nguyen et al. |
| 2013/0326170 | A1 | 12/2013 | Kilari et al. |
| 2014/0068152 | A1 | 3/2014 | Sinclair |
| 2014/0201424 | A1 | 7/2014 | Chen et al. |

OTHER PUBLICATIONS

Di Marco, Alessandro, "Exploiting Commodity Hard-Disk Geometry to Efficiently Preserve Data Consistency", Formal Methods and Stochastic Models for Performance Evaluation, Springer Berlin Heidelberg, 2007, pp. 260-274.

INCITS, "SCSI Block Commands—3 (SBC-3)", Revision 16, Aug. 25, 2008, American National Standards Institute, New York, New York, United States.

INCITS, "AT Attachment with Packet Interface—7 vol. 1—Register Delivered Command Set, Logical Register Set (ATA/ATAPI-7 V1)", Revision 4b, Apr. 21, 2004, American National Standards Institute, New York, New York, United States.

INCITS, "AT Attachment 8—ATA/ATAPI Command Set (ATA8-ACS)", Revision 4a, May 21, 2007, American National Standards Institute, New York, New York, United States.

Seagate Technology Paper, "SmartAlign Technology for Advanced Format Hard Drives", downloaded on Jul. 20, 2011 from www.seagate.com/docs/pdf/whitepaper/tp615_smartalign_for_af_4k.pdf.

Scott Errington, "OS and Application Considerations for Hard Disc Drives With Long Physical Sector Sizes", http://bigsector.net/user_img/Long_Physical_Sector_Sizes_PDF_version_02.pdf.

"Seagate, ""Advanced Format 4K Sector Transition"", May 2010, http://www.seagate.com/docs/pdf/whitepaper/mb604_4k_transition_faq.pdf".

William B. Boyle et al., U.S. Appl. No. 13/356,542, filed Jan. 23, 2012, 21 pages.

Carl E. Bonke, et al., U.S. Appl. No. 13/174,004, filed Jun. 30, 2011, 18 pages.

William B. Boyle et al., Office Action dated Jan. 31, 2014 from U.S. Appl. No. 13/356,542, 29 pages.

William B. Boyle et al., Interview Summary dated Mar. 11, 2014 from U.S. Appl. No. 13/356,542, 3 pages.

William B. Boyle et al., Advisory Action dated Apr. 15, 2014 from U.S. Appl. No. 13/356,542, 3 pages.

William B. Boyle et al., Office Action dated Jun. 11, 2014 from U.S. Appl. No. 13/356,542, 19 pages.

Paragon Software Group, "Partition Alignment Dramatically Increases System Performance", Jul. 5, 2010, http://dl.paragon-software.com/free/Paragon%20Aiignment%20Tooi%20-%20White%20Paper.pdf.

IDEMA, "Advanced Format Downloads", Apr. 24, 2012, www.idema.org.

Seagate, "Tech Insight Transition to Advanced Format 4K Sector Hard Drives", Apr. 28, 2012, http://www.seagate.com/tech-insights/advanced-format-4k-sector-hard-drives-master-ti/.

Wikipedia, "Advanced Format", Sep. 25, 2010, en.wikipedia.org/wiki/Advanced_Format.

Coughlin, T., "Aligning with the Future of Storage", Jun. 2011, Coughlin Associates, Inc., www.tomcoughlin.com.

Heo, T., "ATA 4 KiB sector issues", Mar. 13, 2010, ata.wiki.kernel.org/index.php/ATA_4_KiB-sector_issues.

Dernoncourt, D., "Dealing with WD Advanced Format hard drives on Linux, Windows and Mac OS", Aug. 6, 2010, PCR's notepad.

Smith, R., "Linux on 4KB-sector disks: Practical advice", Apr. 27, 2010, IBM.

VMware, "Recommendations for Aligning VMFS Partitions", Feb. 4, 2009, VMware.

\* cited by examiner

DATA STORAGE DEVICE ALIGNING PARTITION TO BOUNDARY OF SECTOR WHEN PARTITION OFFSET CORRELATES WITH OFFSET OF WRITE COMMANDS

BACKGROUND

Figure 1A:
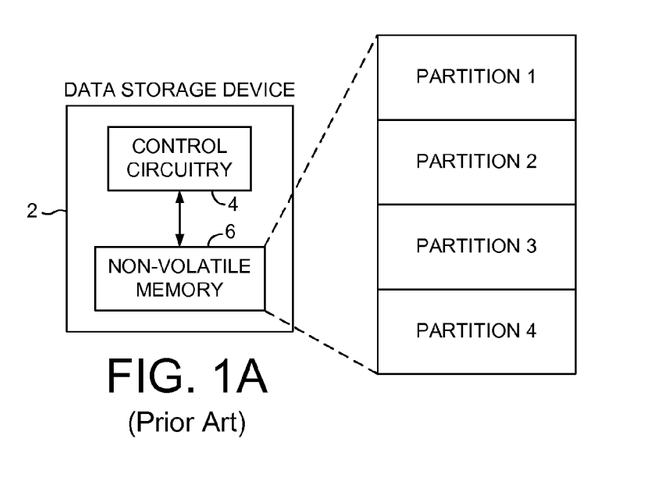
FIG. 1A shows a prior art data storage device comprising control circuitry and a non-volatile memory comprising a plurality of partitions.

FIG. 1A shows a data storage device 2 (e.g., a disk drive or a solid state drive) comprising control circuitry 4 and a non-volatile memory 6, such as a disk or a flash memory. The non-volatile memory 6 comprises a plurality of memory segments referred to as sectors. To facilitate defect mapping, the sectors are accessed indirectly through logical block addresses (LBAs). In this manner, if a sector degrades, the system/user data can be relocated to a spare sector and the corresponding LBA(s) remapped to the spare sector.

Figure 1B:
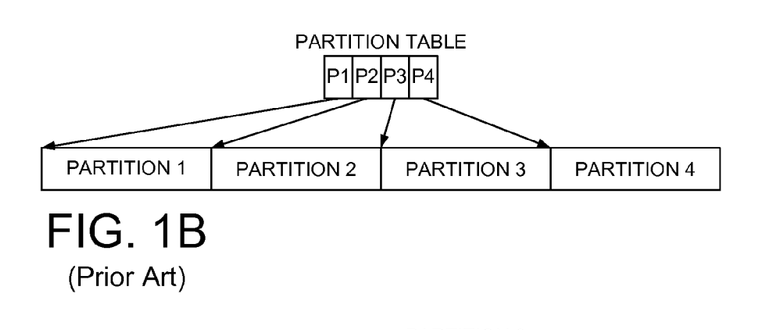
FIG. 1B shows a prior art partition table comprising a number of partition maps.
Figure 1C:
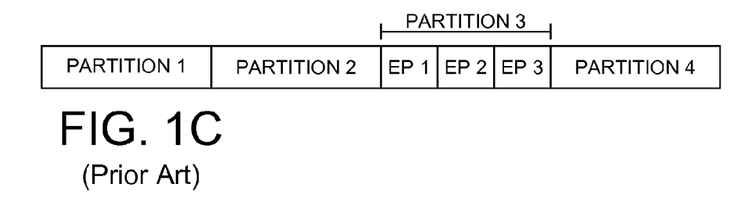
FIG. 1C shows a prior art partition subdivided into a number of extended partitions.
Figure 1D:
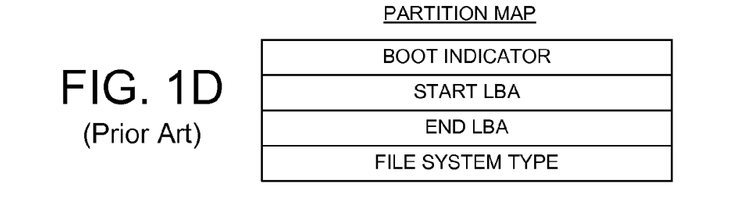
FIG. 1D shows a prior art partition map identifying a starting LBA and ending LBA for the partition, a file system type field, and a flag indicating whether the partition is bootable.

The LBAs of a data storage device may be divided into a number of partitions, wherein each partition stores a file system (e.g., a n-bit FAT file system, or a NT File System) identifying system files and user files. A partition may be bootable meaning that it stores a bootable operating system (OS) such as Windows OS or Mac OS. When a computer system is initially powered on, a master boot record (MBR) is read from the data storage device (typically stored in the first logical data sector). The MBR identifies a partition table that stores a partition map for each partition of the data storage device as illustrated in FIG. 1B. The partition table typically includes up to four primary partition maps identifying up to four primary partitions, wherein a primary partition may be further subdivided into extended partitions as illustrated in FIG. 1C. Each partition map (primary and extended) identifies a starting LBA and ending LBA of the corresponding partition, a file system type field, and a flag indicating whether the partition is bootable as shown in FIG. 1D. When the computer system finds a bootable partition, it uses the file system type field to access the partition's file system in order to read and execute the OS files from the partition (i.e., boot the computer system).

DETAILED DESCRIPTION OF EMBODIMENTS OF THE INVENTION

Figure 2A:
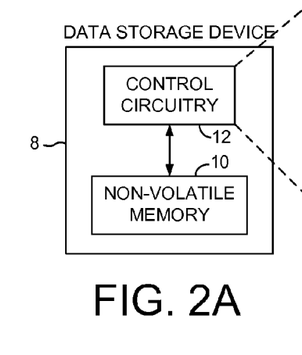
FIG. 2A shows a data storage device comprising a non-volatile memory and control circuitry according to an embodiment of the present invention.

FIG. 2A shows a data storage device 8 according to an embodiment of the present invention comprising a non-volatile memory 10 comprising a plurality of sectors. The data storage device 8 further comprises control circuitry 12 operable to execute the flow diagram of FIG. 2B, wherein a partition map is evaluated (step 14) that identifies a partition accessed through a plurality of logical block addresses (LBAs), where each LBA maps to a fraction of a sector. A partition offset is determined for the partition relative to a boundary of one of the sectors (step 16). N write commands are received (step 20) each having a write offset relative to a corresponding sector. When the write offset for X of the N write commands matches the partition offset (step 30), at least part of the partition is moved to align at least part of the partition to a boundary of one of the sectors (step 32).

Figure 2B:
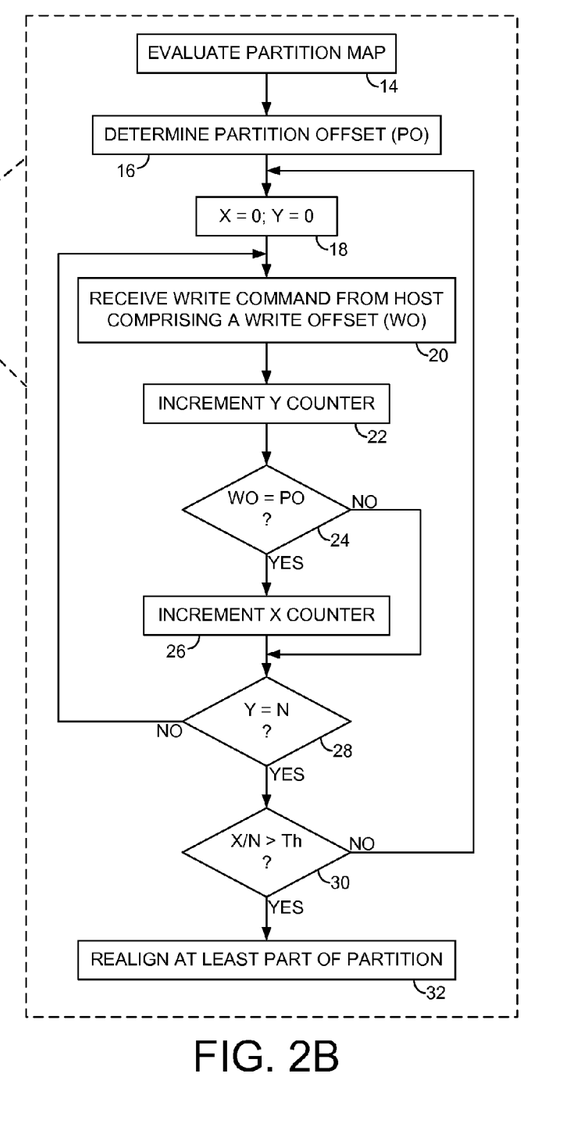
FIG. 2B shows a flow diagram according to an embodiment of the present invention wherein at least part of a partition is aligned with a sector boundary when a write offset matches a partition offset a predetermined number of times over N write commands.

In the embodiment of FIG. 2B, an X counter and a Y counter are initialized to zero (step 18). Each time a write command is received from a host (step 20), the Y counter is incremented (step 22), and each time the write offset of the write command matches the partition offset of the partition (step 24), the X counter is incremented (step 26). After executing N write commands (Y=N at step 28), the X counter is evaluated, wherein if X/N is greater than a threshold (step 30), at least part of the partition is moved to align at least part of the partition to a boundary of one of the sectors (step 32). In the embodiment of FIG. 2B, if X/N is not greater than the threshold (step 30), then the flow diagram is repeated after resetting the X and Y counters (step 18).

Figure 3A:
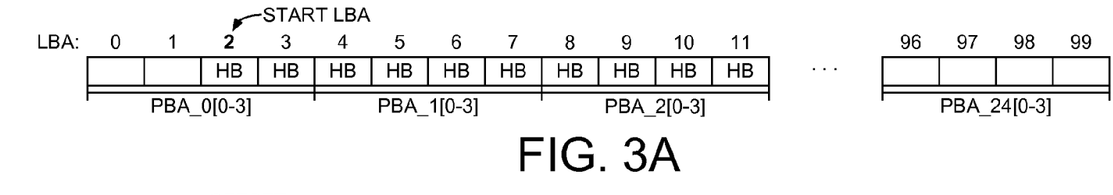
FIGS. 3A and 3B illustrate an embodiment of the present invention wherein at least part of a partition is aligned by shifting a starting LBA of the partition.

In the embodiments of the present invention, when the LBAs of a write command do not align with the boundaries of the sectors in the non-volatile memory 10, the control circuitry 12 will read the fractional sector, modify the data using the new write data, and then write the modified data back to the sector. This is illustrated in FIG. 3A which shows a number of LBAs each mapped to a sector through a physical block address (PBA). In the example of FIG. 3A, each sector of the non-volatile memory stores four host blocks (HBs) such that there are four LBAs mapped to each PBA of a sector. However, any suitable fractional relationship may be employed between the number of LBAs mapped to a PBA of a sector, such as mapping eight LBAs to a PBA of a sector. If the host issues a write command starting at LBA 6 and having a length of eight LBAs, the control circuitry 12 will read PBA_1, modify the HBs corresponding to LBAs 6 and 7, and rewrite the modified data to PBA_1. A similar read-modify-write is required for the last sector of the write command. In this example, the write offset for the write command is two, meaning that the beginning of the write command is offset two LBAs from the beginning of the first sector. In the example of FIG. 3A, four LBAs map into a PBA, and therefore the write offset may be one of zero, one, two and three. In the embodiment where eight LBAs map into a PBA, the write offset may be one of zero, one, two, three, four, five, six and seven.

In the example of FIG. 3A, a partition is defined having a starting LBA of two and a corresponding partition offset of two meaning that the beginning of the partition is offset two LBAs from the beginning of the first sector of the partition. Since the partition offset is two LBAs, an assumption could be made that shifting the partition by two LBAs in order to align the partition with the boundary of a sector will reduce the number of read-modify-write operations and therefore improve performance. However, this assumption could be incorrect leading to even worse performance if the write offsets of the actual write commands do not match the partition offset. Accordingly in the embodiments of the present invention, the write offset of the write commands are evaluated over time to verify that the write offsets for a predetermined number of write commands actually match the partition offset before aligning at least part of the partition to a sector boundary. In the example of FIG. 3A, the write offset for N write commands are evaluated, and at least part of the partition is aligned with a sector (shifted by two host blocks) when the write offset for X of the N write commands matches the partition offset (i.e., when the write offset equals two for X of the N write commands).

Figure 3B:
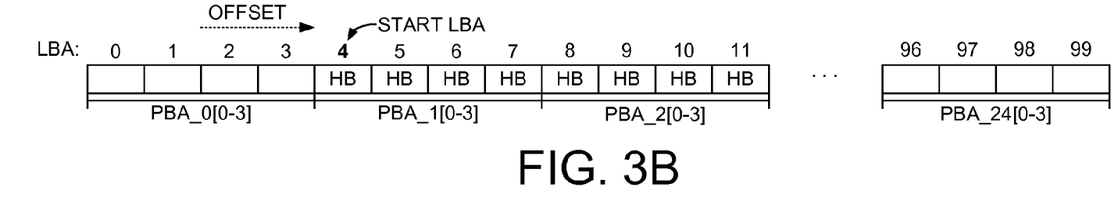

Any suitable technique may be employed to move at least part of a partition to align at least part of the partition to a sector boundary. In an embodiment illustrated in FIG. 3B, moving at least part of the partition comprises shifting a starting LBA of the partition. In the example of FIG. 3B, the starting LBA of the partition is changed from LBA two to LBA four so that the beginning of the partition aligns with PBA_1. In this embodiment, the partition map (e.g., stored in the MBR) is also modified to reflect the change to the staring LBA of the partition, and in one embodiment, the length of the partition may be modified. For example, if the partitions are defined using consecutive LBAs, the length of a partition may be reduced (e.g., by two LBAs in the example of FIG. 3B) to account for the shift in the starting LBA of the partition. Although the example of FIG. 3B shows the starting LBA of the partition shifting right by two LBAs, in another embodiment the starting LBA may be shifted left by the partition offset (and the length of the preceding partition reduced).

Figure 4A:
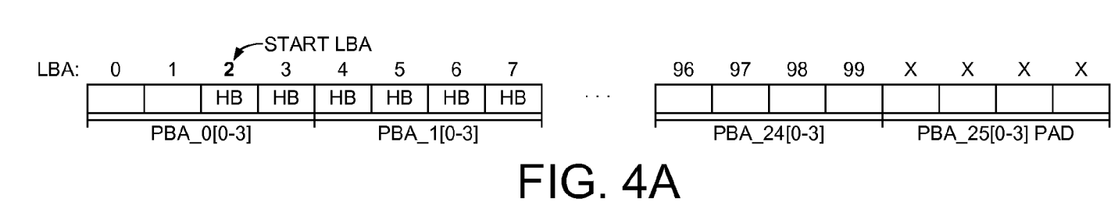
FIGS. 4A and 4B illustrate an embodiment of the present invention wherein at least part of a partition is aligned by remapping at least one LBA from a first sector to a second sector.
Figure 4B:
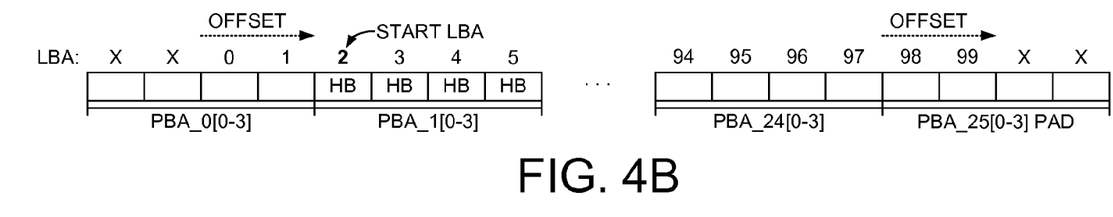

FIGS. 4A and 4B illustrate an alternative embodiment for moving at least part of a partition in order to align at least part of the partition to a sector boundary. In this embodiment, the control circuitry 12 reserves at least one pad sector at the end of each partition (e.g., PBA_25 in FIG. 4A). The mapping of LBAs to PBAs is shifted by the partition offset so that the starting LBA of the partition (LBA two in FIG. 4A) aligns with the sector boundary as shown in FIG. 4B. The last two LBAs of the partition (98 and 99) are mapped to the first two host blocks of the pad sector at the end of the partition. In this embodiment, it is not necessary to modify the partition map (e.g., stored in the MBR) since the starting LBA (and length) of the partition remain the same. In another embodiment, the control circuitry 12 may reserve a pad sector at the beginning of each partition so that the LBA to PBA mapping may be shifted left by the partition offset.

In the embodiment of FIGS. 3A and 3B and in the embodiment of FIGS. 4A and 4B, the host blocks of previously written sectors are moved so that the mapping of LBA to HB remains intact. To avoid corrupting the host data while shifting the HBs, in one embodiment the control circuitry 12 may unmount the partition so that the host does not attempt to access the partition during the shifting procedure. Other embodiments may allow the host to access the partition during the shifting operation while taking other precautions, such as making a copy of HBs that are being shifted. In one embodiment, the beginning of a partition may store critical data, such as operating system data and file system data that if corrupted may render the data storage device inoperable. In this embodiment, the control circuitry 12 may shift a part of the partition that extends past a certain number of LBAs from the beginning of the partition. That is, the control circuitry 12 may choose not to shift the beginning of a partition to avoid the possibility of corrupting critical data during the shift operation.

Figure 5:
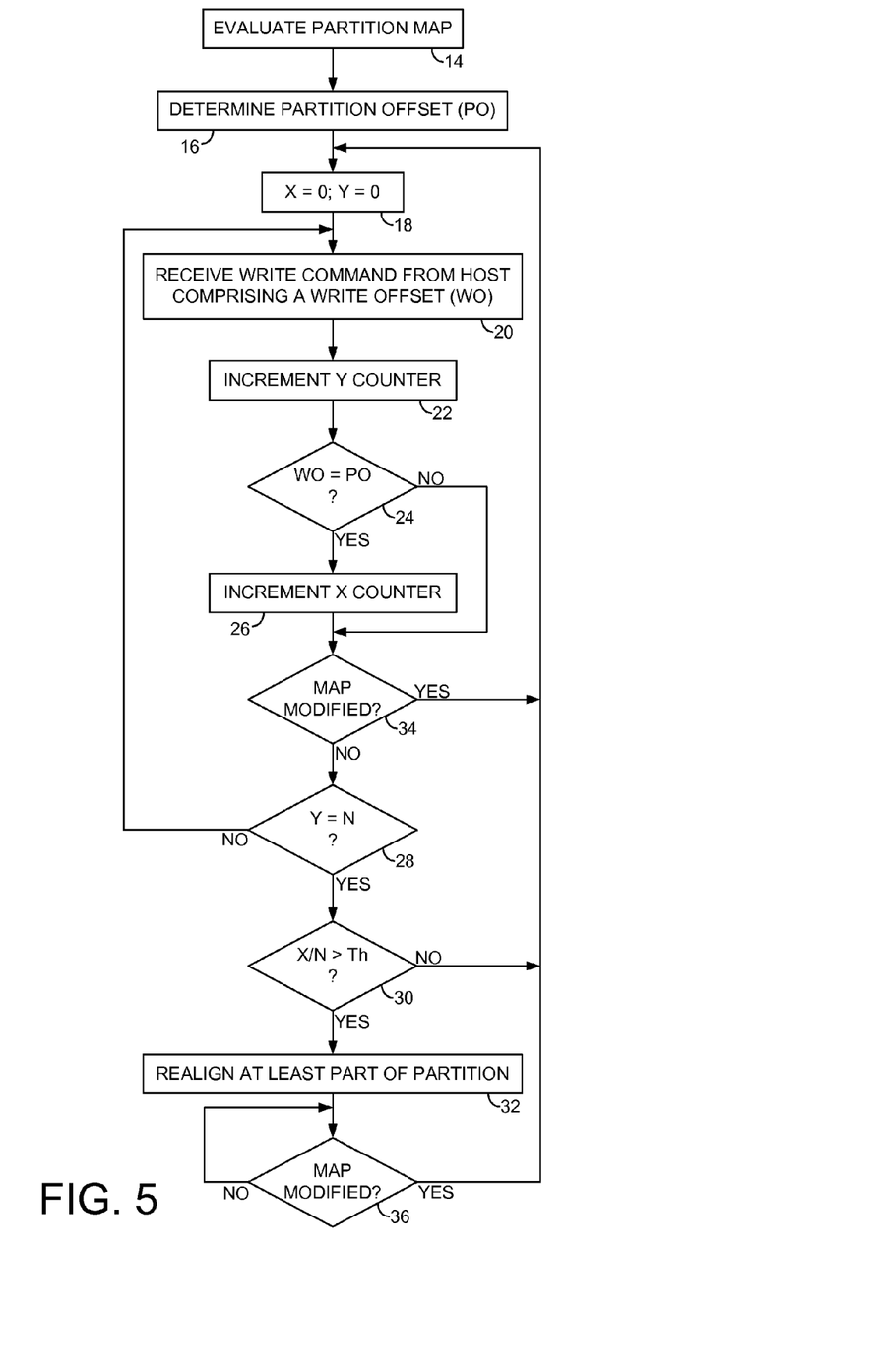
FIG. 5 is a flow diagram according to an embodiment of the present invention wherein when the partition map is modified, the procedure for detecting a misaligned partition is reset.

FIG. 5 is a flow diagram according to an embodiment of the present invention which expands on the flow diagram of FIG. 2B. In this embodiment, a host may modify the partition map(s) of the data storage device (e.g., by writing to the MBR). Accordingly, the control circuitry 12 monitors the partition map(s) and when the partition map(s) is modified, the flow diagram of FIG. 5 is restarted by initializing the X and Y counters to zero at step 18. The control circuitry 12 may detect that a partition map is modified (step 34) during the process of evaluating the N write commands prior to shifting the partition. Alternatively, the control circuitry 12 may detect that a partition map is modified (step 36) after the partition has already been shifted (or while shifting the partition at step 32). In either case, the control circuitry 12 resets the X and Y counters so that the procedure of correlating the write offsets with the partition offset is restarted.

In the embodiments of the present invention, the control circuitry 12 may evaluate the partition map at step 14 of FIG. 2B using any suitable technique. In one embodiment, the control circuitry 12 may read a MBR from the non-volatile memory which is typically stored in the first sector (sector zero), where the MBR comprises a partition table that includes one or more partition maps. In another embodiment, the control circuitry 12 may receive a partition map from a host as part of a configuration command. For example, a host may send a command to configure the data storage device with desired partition map(s) using a suitable configuration command, or the host may notify the data storage device of the partition map configuration to enable the control circuitry to perform the internal partition alignment procedure described above. In yet another embodiment, the control circuitry 12 may monitor an access pattern of the non-volatile memory by the host in order to infer the content of the partition map(s), including the partition offset(s). In the flow diagram of FIG. 5, the control circuitry 12 may detect that a partition map has been modified by detecting a write to the MBR (a write to sector zero), or receiving a configuration or notification command from the host, or by detecting a change in the access pattern to the non-volatile memory, or using any other suitable technique.

The flow diagrams disclosed herein may be carried out by a microprocessor executing code segments of a program stored on a computer readable medium. Any suitable computer readable storage medium capable of storing code segments may be employed, such as the data storage device being aligned, or a separate data storage device, such as a disk drive, or a flash memory, or a CD.

Figure 6:
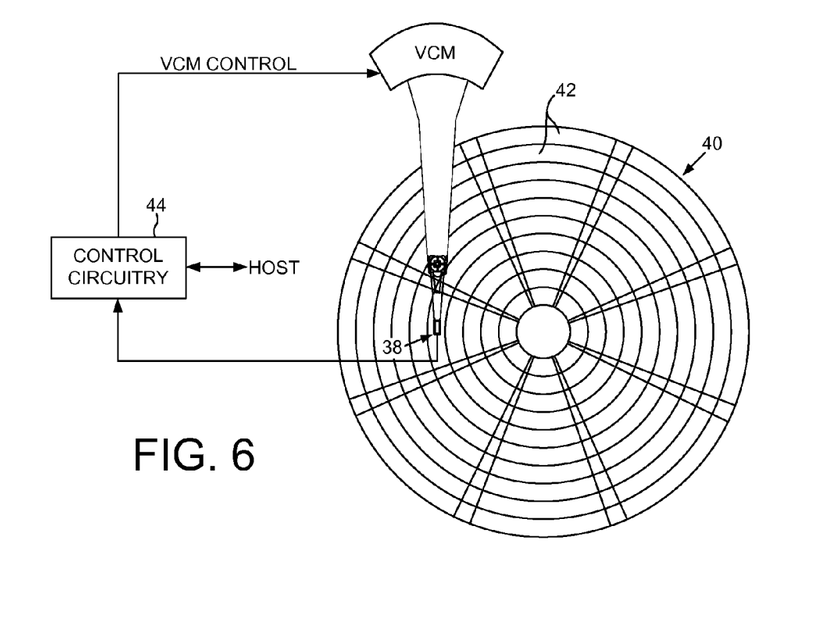
FIG. 6 illustrates an embodiment of the present invention wherein the data storage device comprises a disk drive.

The embodiments of the present invention may be used to align a partition of any suitable data storage device. FIG. 6 shows a data storage device in the form of a disk drive comprising a head 38 actuated over a disk 40 having a plurality of tracks 42. The disk drive further comprises control circuitry 44 for receiving access commands from a host (write/read commands) and for generating a control signal applied to a voice coil motor (VCM) to rotate an actuator arm about a pivot in order to position the head 38 radially over the disk 40 to access a target track. Each track is divided into a number of sectors, wherein each sector is capable of storing multiple host blocks.

Figure 7:
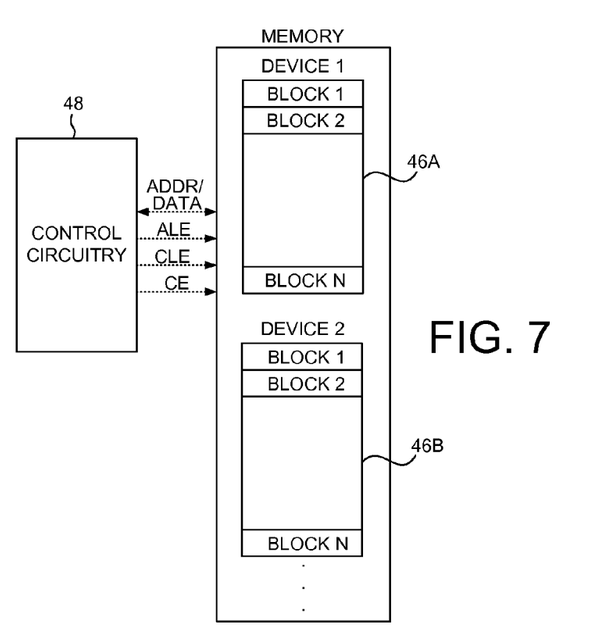
FIG. 7 illustrates an embodiment of the present invention wherein the data storage device comprises a solid state drive.

FIG. 7 shows a data storage device in the form of a solid state drive comprising a plurality of non-volatile semiconductor memories 46A, 46B, etc., such as flash memories, and control circuitry 48 for accessing the non-volatile semiconductor memories. In one embodiment, a sector of the solid state drive corresponds to a page of memory in a memory array, wherein each page stores a plurality of host blocks. A hybrid data storage device may also be employed comprising components of a disk drive shown in FIG. 6 combined with the non-volatile semiconductor memories shown in FIG. 7.

What is claimed is:

1. A method of aligning a partition of a data storage device to a boundary of a sector, the data storage device comprising a non-volatile memory comprising a plurality of sectors, the method comprising:
   (a) evaluating a partition map that identifies a partition accessed through a plurality of logical block addresses (LBAs), and each LBA maps to a fraction of a sector;
   (b) determining a partition offset for the partition relative to a boundary of one of the sectors;
   (c) receiving N write commands each having a write offset relative to a corresponding sector; and
   (d) when the write offset for X of the N write commands matches the partition offset, moving at least part of the partition to align at least part of the partition to a boundary of one of the sectors, wherein X and N are positive integers.

2. The method as recited in claim 1, wherein moving at least part of the partition comprises shifting at least one LBA of the partition.

3. The method as recited in claim 2, wherein moving at least part of the partition comprises shifting a starting LBA of the partition.

4. The method as recited in claim 1, wherein moving at least part of the partition comprises remapping at least one LBA from a first sector to a second sector.

5. The method as recited in claim 1, further comprising repeating steps (a) through (d) when the partition map is modified.

6. The method as recited in claim 1, wherein each LBA maps to one-fourth of a sector such that the partition offset may be one of zero, one, two and three.

7. The method as recited in claim 1, wherein each LBA maps to one-eighth of a sector such that the partition offset may be one of zero, one, two, three, four, five, six, and seven.

8. The method as recited in claim 1, further comprising reading the partition map from the non-volatile memory.

9. The method as recited in claim 1, further comprising receiving the partition map from a host.

10. The method as recited in claim 1, further comprising inferring the partition map based on an access pattern of the non-volatile memory.

11. A data storage device comprising:
   a non-volatile memory comprising a plurality of sectors; and
   control circuitry operable to aligning a partition of a data storage device to a boundary of a sector by:
   (a) evaluating a partition map that identifies a partition accessed through a plurality of logical block addresses (LBAs), and each LBA maps to a fraction of a sector;
   (b) determining a partition offset for the partition relative to a boundary of one of the sectors;
   (c) receiving N write commands each having a write offset relative to a corresponding sector; and
   (d) when the write offset for X of the N write commands matches the partition offset, moving at least part of the partition to align at least part of the partition to a boundary of one of the sectors, wherein X and N are positive integers.

12. The data storage device as recited in claim 11, wherein moving at least part of the partition comprises shifting at least one LBA of the partition.

13. The data storage device as recited in claim 12, wherein moving at least part of the partition comprises shifting a starting LBA of the partition.

14. The data storage device as recited in claim 11, wherein moving at least part of the partition comprises remapping at least one LBA from a first sector to a second sector.

15. The data storage device as recited in claim 11, wherein the control circuitry is further operable to repeat steps (a) through (d) when the partition map is modified.

16. The data storage device as recited in claim 11, wherein each LBA maps to one-fourth of a sector such that the partition offset may be one of zero, one, two and three.

17. The data storage device as recited in claim 11, wherein each LBA maps to one-eighth of a sector such that the partition offset may be one of zero, one, two, three, four, five, six, and seven.

18. The data storage device as recited in claim 11, wherein the control circuitry is further operable to read the partition map from the non-volatile memory.

19. The data storage device as recited in claim 11, wherein the control circuitry is further operable to receive the partition map from a host.

20. The data storage device as recited in claim 11, wherein the control circuitry is further operable to infer the partition map based on an access pattern of the non-volatile memory.

* * * * *